United States Patent [19]
Pramono et al.

[11] Patent Number: 5,971,658
[45] Date of Patent: Oct. 26, 1999

[54] INTEGRATED ARMORED EROSION CONTROL SYSTEM

[76] Inventors: Wasi Tri Pramono, Suite 200-2525 Tecumseh Road West, P.O. Box 1299, Windsor, Ontario, Canada, N9A 6R3; John A. McCorquodale, 6237 Paris Ave., New Orleans, La. 70122

[21] Appl. No.: 09/039,448

[22] Filed: Mar. 16, 1998

Related U.S. Application Data

[63] Continuation-in-part of application No. 08/720,841, Oct. 3, 1996, abandoned.

[51] Int. Cl.$^6$ ...................................................... E02B 3/06
[52] U.S. Cl. ............................... 405/21; 405/15; 405/16; 405/33; 405/20
[58] Field of Search .................................. 405/16, 17, 19, 405/20, 21, 29, 30, 31, 32, 33, 34, 35; 403/80, 145, 294; 52/85, 89, 582.1; 404/41; 256/13.1, 26

[56] References Cited

U.S. PATENT DOCUMENTS

| | | |
|---|---|---|
| 991,041 | 5/1911 | Toennes . |
| 2,466,343 | 7/1949 | Weber ........................................ 405/33 |
| 2,652,692 | 9/1953 | Hayden . |
| 3,096,621 | 7/1963 | Danel . |
| 3,210,944 | 10/1965 | Svee ........................................ 405/33 |
| 4,188,153 | 2/1980 | Taylor ...................................... 405/34 |
| 4,219,961 | 9/1980 | Stiles . |
| 4,279,536 | 7/1981 | Jarlan . |
| 4,370,075 | 1/1983 | Scales . |
| 4,372,705 | 2/1983 | Atkinson . |
| 4,375,928 | 3/1983 | Crowe et al. . |
| 4,436,447 | 3/1984 | Crowe . |
| 4,474,504 | 10/1984 | Whitman et al. . |
| 4,564,311 | 1/1986 | Scales . |
| 4,664,552 | 5/1987 | Schaaf . |
| 5,108,222 | 4/1992 | Jansson et al. . |
| 5,556,228 | 9/1996 | Smith . |

FOREIGN PATENT DOCUMENTS

| | | |
|---|---|---|
| 2486-567 | 1/1982 | France . |
| 3942838 A1 | 6/1991 | Germany . |
| 55-68912 | 5/1980 | Japan . |
| 56-39221 | 4/1981 | Japan . |
| 59-224710 | 12/1984 | Japan . |
| 59-224711 | 12/1984 | Japan . |
| 1-142111 | 6/1989 | Japan . |
| 404080412 | 3/1990 | Japan . |
| 404189910 | 7/1992 | Japan . |
| 1717704A1 | 3/1992 | U.S.S.R. . |

*Primary Examiner*—David Bagnell
*Assistant Examiner*—Jong-Suk Lee
*Attorney, Agent, or Firm*—R. Craig Armstrong

[57] ABSTRACT

An erosion control system is useful for coastlines, riverbeds, and the like, to protect against erosion caused by a wavefront. The system typically includes an integrated armor layer mounted upon and covering an embankment adjacent the shoreline. The armor layer comprises a plurality of blocks connected in a chainlike configuration by connecting members disposed between neighboring blocks. Each chain is linearly aligned in a direction generally perpendicular to the shore and wavefront, and each chain abuts neighboring chains, but not affixed in any manner thereto. The connecting members have separate elements for absorbing tension and compression.

9 Claims, 8 Drawing Sheets

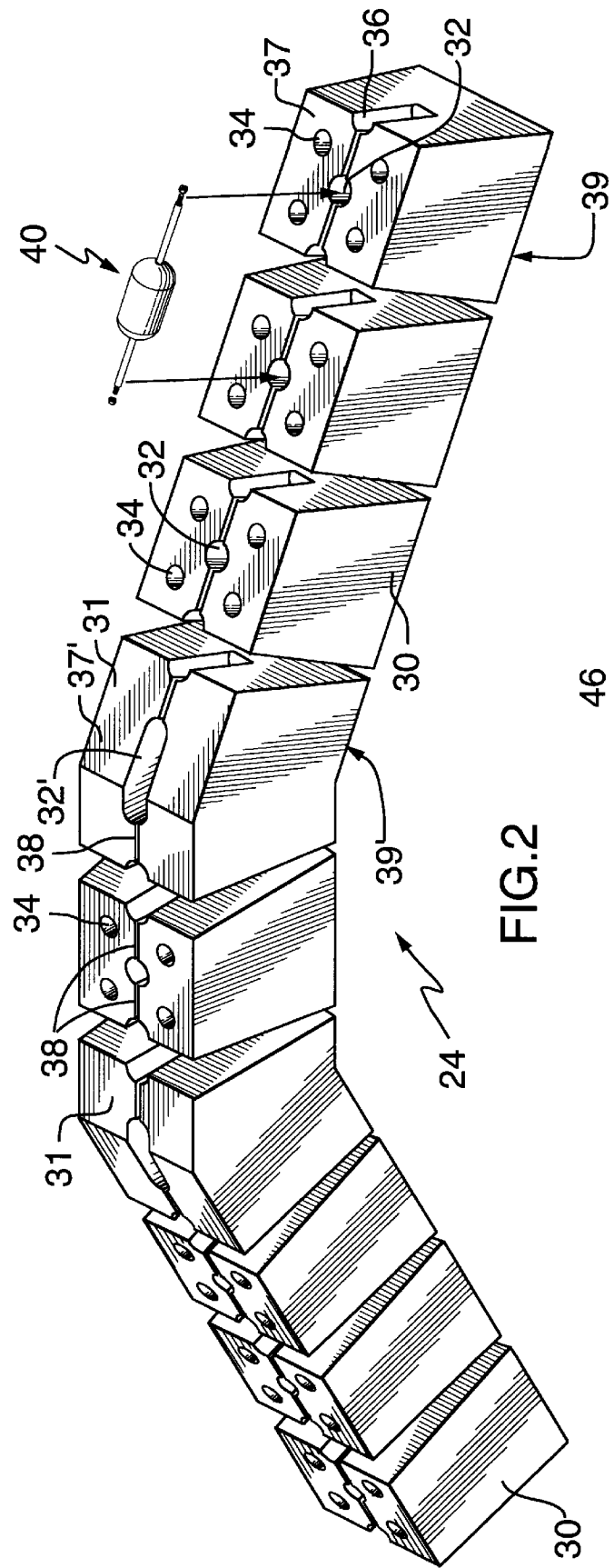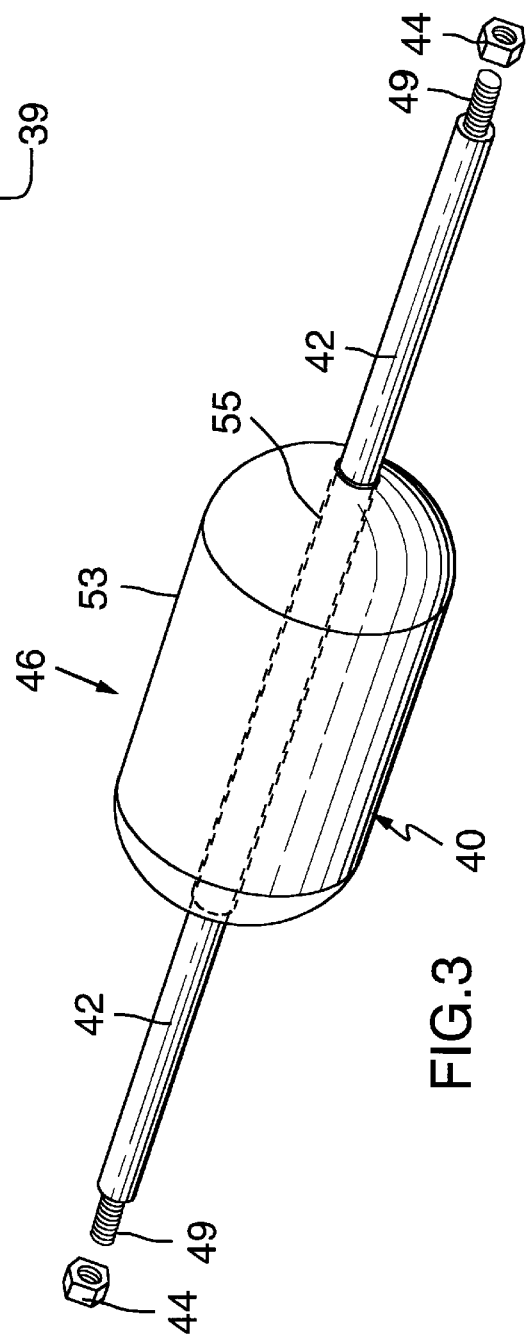

INTEGRATED ARMORED EROSION CONTROL SYSTEM

REFERENCE TO RELATED APPLICATION

This is a continuation-in-part of application Ser. No. 08/720,841, filed Oct. 3, 1996, now abandoned.

BACKGROUND OF THE INVENTION

This invention relates to the prevention or limitation of shoreline or coastal erosion due to wave action, and more particularly, to an erosion control system using an array of blocks chained together by connecting members and placed on the surface of an embankment in the water generally parallel to the shoreline.

Shoreline erosion is a major threat to coastal areas where large land masses are exposed to the continual pounding of the ocean wavefronts. While this problem is of concern to any country having significant coastline, the problem is particularly acute in island nations, such as Japan, Indonesia, Malaysia, and the Philippines. Numerous systems have been proposed to prevent erosion at the interface of water and land.

U.S. Pat. No. 5,108,222 (Jansson et al.) discloses an articulated mat comprising concrete blocks arranged in a rectangular and flexible grid. Each block has the shape of an elongated cube and has a hole centrally disposed therethrough enabling each block to be readily removed from a form used for casting each block.

U.S. Pat. No. 4,474,504 (Whitman et al.) Discloses an underwater erosion control system having primary elements that are equilateral triangles having truncated tips, each side of the triangle having a truncated, conically-shaped aperture disposed at the midpoint thereof. A link has truncated, conically-shaped ends that secure two abutting primary elements together, maintaining a fixed distance between the primary elements.

U.S. Pat. No. 4,372,705 (Atkinson) discloses an articulated erosion control system of lock blocks and key blocks, which enable the blocks to be interlocked together without extraneous connectors. The lock blocks have a generally hexagonal shape, with cylindrical grooves in alternating sides thereof, and the key blocks comprise a central locking hub from which extend three separately spaced-apart locking arms.

U.S. Pat. No. 4,279,536 (Jarlon) discloses a breakwater disposed upon a rubble mound. Each block includes marginal partial ducts on the four side surfaces that form ducts with some adjacent blocks or intermeshed engagement with the adjacent blocks. The breakwater includes an armor capping of blocks having interlocking surfaces disposed therebetween.

While these systems and others like them have generated much discussion and interest, none have provided a satisfactory solution.

What is needed is an integrated armor cladding mounted onto an embankment, the cladding having a high wave energy dissipation rate. An integrated armor structure is needed that can be advantageously used for redirecting and redistributing hydrodynamic forces caused by pounding seawater on an embankment, by cladding the embankment with the armor layer.

The integrated armor structure will resist movement of the blocks relative to each other by the use of connecting members disposed between each pair of adjacent blocks in the chain.

SUMMARY OF THE INVENTION

An array of blocks can advantageously be used to dissipate the energy of waves of seawater or rivers breaking upon the embankment, by cladding the entire surface of the embankment with an armor layer made from closely aligning chains of blocks with connecting members. Without the armor cladding, the embankment would be soon destroyed by the constant pounding of the waves.

The integrated armor design provides a more stable and economical design of breakwaters as wave control and coastal protection structures. The blocks are integrated using a unique connecting member designed to carry the hydrodynamic forces acting on the blocks.

The array of blocks provides an erosion control system which is useful for shorelines, riverbeds, and the like from soil erosion caused by a wavefront. The system typically includes an integrated armor layer mounted upon and covering an embankment adjacent to the shoreline. The armored layer comprises a plurality of blocks joined together in a chainlike configuration with connecting members disposed between neighboring blocks. The connecting members are easily inserted and removed from the blocks. Should one break, another may replace it without disrupting the laid chain of blocks. Each chain is linearly aligned normal to the wavefront, i.e. in a direction aligned with the direction of travel of the wavefront. Each chain abuts neighboring chains, but is not affixed in any manner thereto.

The individual blocks are in the shape of a truncated pyramid, having rectangular top and bottom surfaces. The primary blocks include a central passageway, and preferably a plurality of ducts extending from the top to the bottom surface, and substantially parallel to the axis of the block. The blocks retain the connecting member by a centrally disposed channel and two recessed openings commencing at the top surface and extending about halfway down the block and joining the lateral surfaces of the block.

Each connecting member comprises a rod or the like, the rod having an element at each end positionable in the central channel of adjacent blocks to prevent axial extension of the distance between the blocks. The connecting member further comprises a body member positionable between adjacent blocks, the body member being compression absorbing. In the preferred embodiment, the body member is slidable along the length of the rod.

The hydrodynamic forces induce tensile and compressive forces within the connecting members. Accordingly, each connecting member has a tension resistance mechanism and a compression resistance mechanism. The tension resistance mechanism comprises the combination of the rod and the pair of end elements. The compression resistance mechanism comprises the body member. All linear tensile forces are absorbed within the chain by the rods and end elements. All linear compressive forces are absorbed by the body members.

The integrated armor layer covers the embankment and comprises a plurality of adjacent chains, each chain comprising a plurality of alternating blocks and connecting members. Each block, save for the blocks at the end of the chain, is sandwiched between a pair of neighboring blocks, and is attached to each neighboring block by a connecting member.

The integrated armor design will distribute the hydrodynamic forces to all armor units arranged in each chain to increase the stability of the armor units. Since the blocks in the chain work together, the size of the individual blocks can be reduced. Furthermore, since the armor layer is stronger than traditional designs, the size of the core materials can be reduced significantly.

For a more complete understanding of the system and components of the present invention, reference is made to the following detailed description and accompanying drawings in which the presently preferred embodiments of the invention are shown by way of example. As the invention may be embodied in many forms without departing from the spirit of essential characteristics thereof, it is expressly understood that the drawings are for purposes of illustration and description only, and are not intended as a definition of the limits of the invention.

BRIEF DESCRIPTION OF THE DRAWINGS

FIG. 2 is an enlarged elevational view of a chain of blocks and connecting members of the preferred embodiment of the integrated armor structural system of FIG. 1;

FIG. 3 is an exploded isometric view of a connecting member of the preferred embodiment of the integrated armor structural system of FIG. 2;

DETAILED DESCRIPTION OF THE PREFERRED EMBODIMENT

Figure 1:
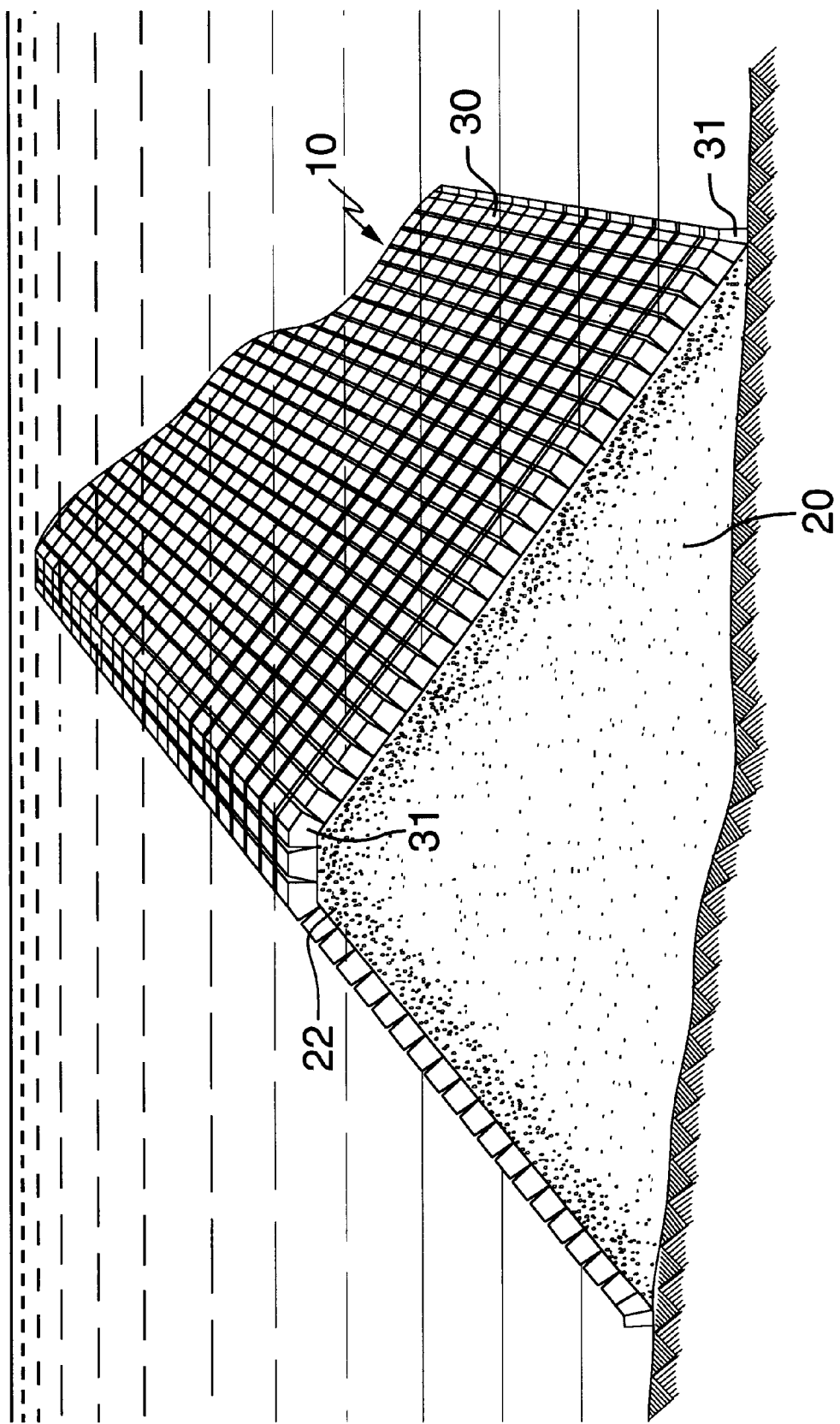
FIG. 1 is an elevational view of the preferred embodiment of the integrated armor structural system of the present invention mounted onto an embankment.
Figure 4:
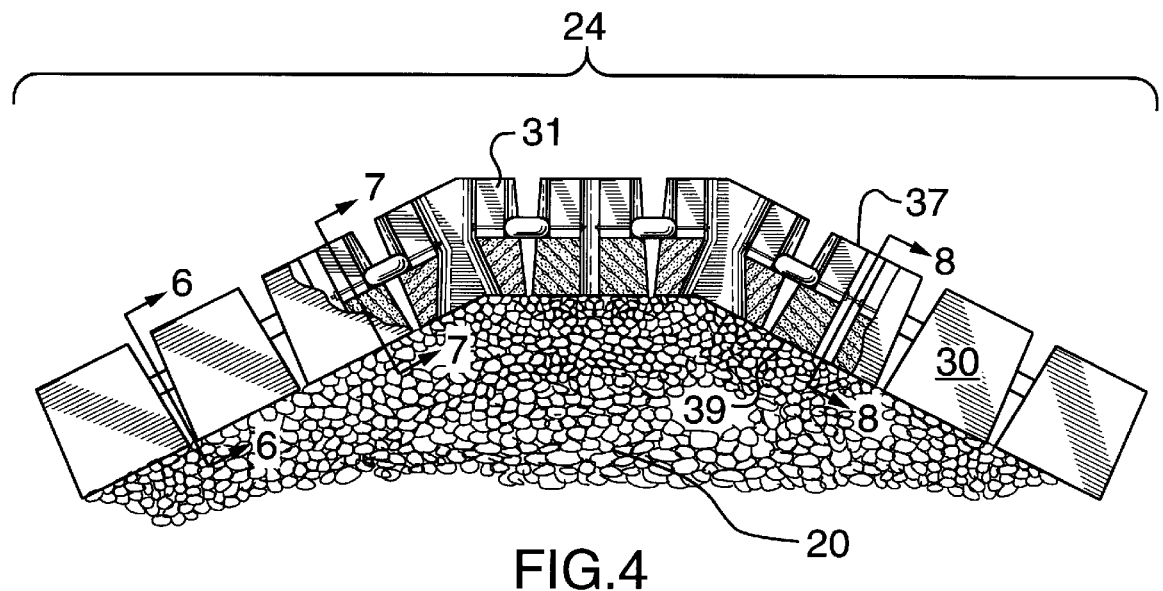
FIG. 4 is a side elevational view partially cutaway of the chain of blocks and connecting members of the preferred embodiment of the integrated armor structural system of FIG. 2.
Figure 5:
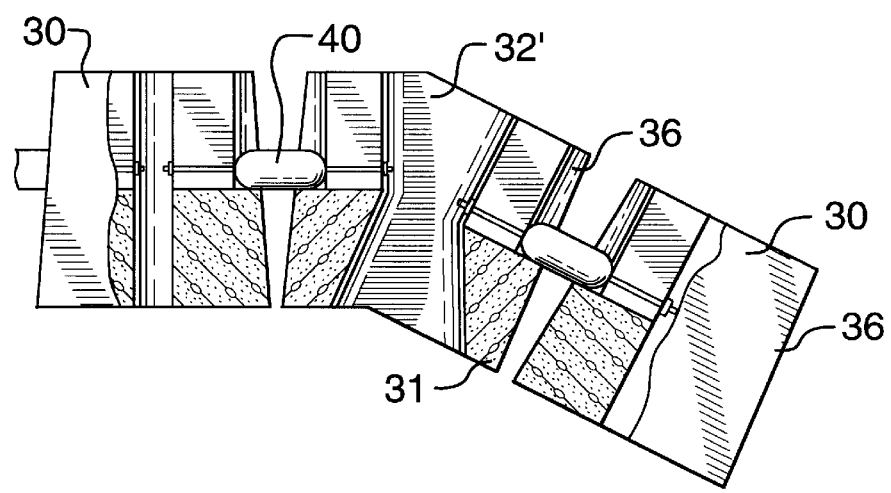
FIG. 5 is an enlarged side elevational view partially cutaway of the chain of blocks and connecting members of the preferred embodiment of the integrated armor structural system of FIG. 4.

The preferred embodiment of the system is shown in FIGS. 1–12. FIG. 1 discloses the integrated armor structural system 10 clad onto an embankment 20.

The system comprises a plurality of blocks 30 generally covering the embankment 20, and connecting members 40 for retaining the blocks 30 with respect to neighboring blocks 30 within any given chain on the embankment 20. The blocks 30 and connecting members 40 are arranged relative to each other covering and protecting the embankment 20 in an array of chains 24, with each chain-like configuration 24 abutting the wavefront (see FIGS. 4 and 5).

Each block 30 has a generally truncated pyramid shape, with a square top and bottom surface 7 and 39 that are normal to an axis of the block 30. The blocks 30 are only connected in a linear direction along the chain 24, and there is no interlinkage between adjacent chains 24.

With reference to FIG. 2, each block 30 preferably includes means for reducing hydrodynamic uplift forces applied to the bottom surface 39. The reducing means preferably comprises a passageway 32 disposed in the center of each block 30, and four ducts 34 generally equally spaced between the central passageway 32. The ducts 34 extend from the top surface 37 to the bottom surface 39, and are generally parallel to the axis of the block 30.

As shown in FIG. 2, each of the primary blocks 30 includes means disposed on opposing sides thereof for receiving connections to a pair of neighboring blocks 30, one on each side. The opposing lateral neighboring surfaces of each block include a recessed opening 36 therein, extending from the top surface 37 to about halfway down toward the bottom surface 39. Since the shape of the block 30 is a truncated pyramid, the size and angle of the recessed openings 36 become progressively larger moving in a downward direction relative to the block 30. The maximum angle of the recessed opening 36 is a semicircle, at the lowermost portion of the recessed openings 36.

Figure 6:
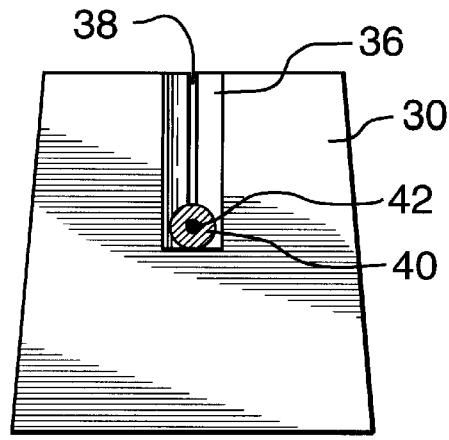
FIG. 6 is an enlarged sectional view taken through the center of a connecting member from FIG. 4 through Section 6—6.
Figure 7:
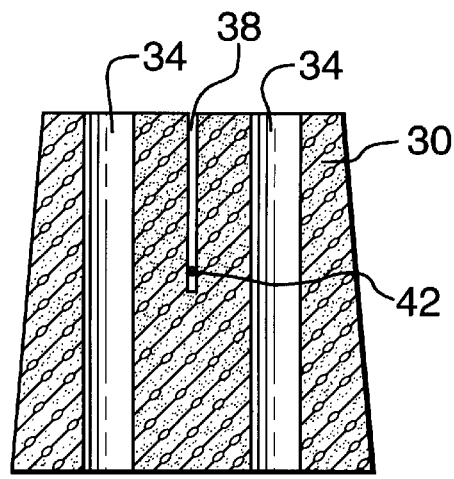
FIG. 7 is an enlarged sectional view taken through a portion of a block and a connecting member from FIG. 4 through Section 7—7.
Figure 8:
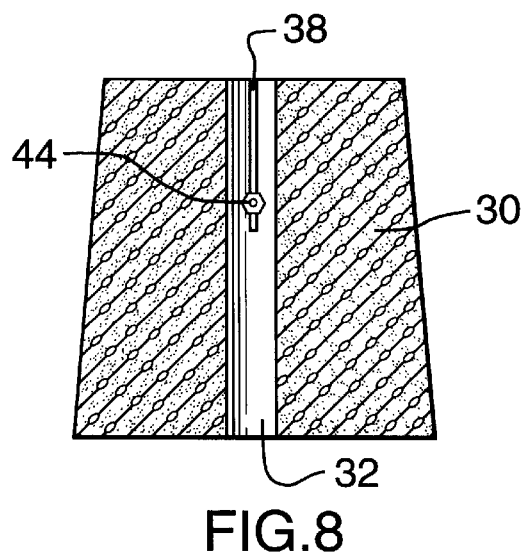
FIG. 8 is an enlarged sectional view taken through the center of a block from FIG. 4 through Section 8—8.

Each block 30 also includes a channel 38 having parallel sidewalls extending centrally through each block 30, from one recessed opening 36 surface through the central passageway 32, and to an opposing recessed opening 36 surface, as shown in FIGS. 2 and 6. The channels 38, like the recessed openings 36, extend from the top surface 37 to about halfway down toward the bottom surface 39.

The entire chain 24 typically comprises the same block 30 throughout, except for two crown-corner blocks 31 disposed at the crown 22 of the embankment 20. The crown-corner blocks 31 have an irregular shape. One crown-corner block 31 is on the seaward side of the crown 22, and the other is on the landward side of the crown 22.

Since the crown 22 is generally horizontal, the top and bottom surfaces 37' and 39' of the crown-corner blocks 31 are formed by the intersection of two planes, the two lines of intersection being parallel to each other and parallel to the seaward and landward edge of the embankment 20. The top surface 37' of the crown-corner blocks 31 are parallel to the bottom surface 39' of each crown corner block. The angle of the intersecting planes on the top and bottom surfaces 37 and 39 of the crown-corner blocks 31 are supplementary to the slope of the embankment 20 on the seaward and landward sides of the embankment 20, respectively, since part of the crown corner block is disposed on the slope and the other part on the crown 22.

The crown-corner blocks 31 have two channels 38 and two recessed openings 36, the same as the other blocks 30. However, the only opening extending from the top surface 37' to the bottom surface 39' for uplift force relief is an oblong-shaped central passageway 32' that has the same diameter as the central passageways 32 on the other blocks 30. The oblong shaped central passageway 32' is centered relative to block 31 with the oblong portion being generally parallel to the channels 38. The shape of the oblong central passageway 32' on the top and bottom surfaces 37' and 39' is generally a capsule being rectangular, with circular ends. The shape of the oblong portion of the central passageway 32' is the smallest about midway down the block 31 and expands outwardly moving toward the top and bottom surface 37' and 39'. Also, while FIG. 1 shows two crown-corner blocks 31 disposed at the base of the embankment 20, and inverted, one on the landward side and one on the seaward side, this is not necessary.

Each connecting member 40 preferably comprises a rod 42, the rod having an element 44 at each end positionable in the central channel of adjacent blocks to prevent axial extension of the distance between the blocks, the element being too large to be pulled through the channels 38. The connecting member further comprises a body member 40 which is compression absorbing. In the preferred embodiment, the body member is slidable along the length of the rod.

The preferred embodiment of the connecting member 40 is shown in FIG. 3. In the preferred embodiment, the connecting member 40 comprises a stainless steel rod 42 with threaded ends 49, two nuts as the elements 44 disposed one at each threaded end 49, and a body member 46. Washers may be used between the nuts 44 and the block 30 to improve wear. Each rod 42 has a generally cylindrical shape, the diameter of which is slightly less than the diameter of the channel 38 for fitting therewithin. Each nut or washer or other element 44 is larger than the channel 38 to enable secure retention therewithin of the rod 42 when positioned within the central passageway 32. For greater certainty, it should be understood that other end elements may be substituted for the configuration described above and still fall within the scope of the invention. For instance, it may be desirable in certain situations that the end element be integrally formed on the rod. In that situation the end element could be a radially extending shape having a width slightly larger than the width of the channel 38. In other situations, an aperture on each end of the rod to receive a horizontal bar having a length being slightly larger than the channel 38 would also fall within the scope of the invention.

The preferred embodiment of the body member 46 is also shown in FIG. 2. All linear compressive forces are absorbed by the body members, made from compressively absorbing material. In the preferred embodiment, the body member 46 has a generally cylindrical shape with semispherical ends, like a capsule, the semispherical ends cooperatively engaging into the recessed openings 36. In the preferred embodiment, the body member 46 is filled with nonreinforced concrete to enable the body member 46 to withstand compressive forces generated by the continual pounding of the waves. The rod 42 includes a thin layer of epoxy to prolong the life of the rod 42. For greater certainty, it is understood that alternative embodiments of the body member having compression absorbing qualities may be implemented in the invention and still fall within the scope of the invention. For instance, another embodiment of the body member include a slidable hydraulic brake means in place of the concrete-based body member.

As shown in FIG. 2, the connecting member is, advantageously, easily removable from the neighboring blocks. In situations where the system is installed and the connecting member is damaged beyond functional use, the connecting member may be replaced with a new one without disrupting the remaining chain of blocks. As a consequence, maintenance costs of the system after it is installed is decreased.

The body member 46 preferably has a central aperture 55 extending therethrough, and the diameter of the aperture 55 is greater than the diameter of the rod 42, thus enabling the body member 46 to move freely along the rod 42, and therefore avoid tensile stress within body member 46. Also, PVC pipe inserted in the aperture 55 having the same diameter and length as the aperture 55 may be used to reduce the frictional force between the rod 42 and the body member 46. Concrete has a strong compressive stress, and since this design only allows compressive forces within the body member 46, the concrete does not need reinforcement.

The concrete used in the blocks and in the body portion of the connecting member is preferably CSA Standard CAN 3-A23.3 M89 or ACI 318. The compressive stress is 30 to 35 Mpa (after twenty-eight days).

In the preferred embodiment, the water to cement ratio is 9.5. The aggregate to cement ratio is 4. The fine and coarse aggregate ratio is 1.2. The slump is approximately 3 inches. A smooth surface is preferred to reduce surface roughness of the block, which also is useful to improve block life.

During installation, each connecting member 40 is sandwiched between a pair of blocks 30, the body member 46 resting in the neighboring recessed openings 36 of each block 30, and the nuts 44 secured within the central passageway 32 of each.

The rod 42 is preferably made of stainless steel type 316, but type 304 is also acceptable. The length of the rod 42 depends upon the size of the block 30. The diameter of the rod 42 is from 12.7 mm to 15.9 mm. The body member 46 has an inner diameter of 3 cm and an outer diameter of 190 mm, with a length of 375 mm.

Preferably, the rod 42 is initially cleansed in an appropriate manner. A phosphate coating and a chromate conversion coating may then be applied, both of which are widely used as paint bases on both uncoated and galvanized steel. The coating may be applied by spraying, dipping, or flow-rolling. Roller coating or electrophoretic deposition may also be used.

Figure 9:
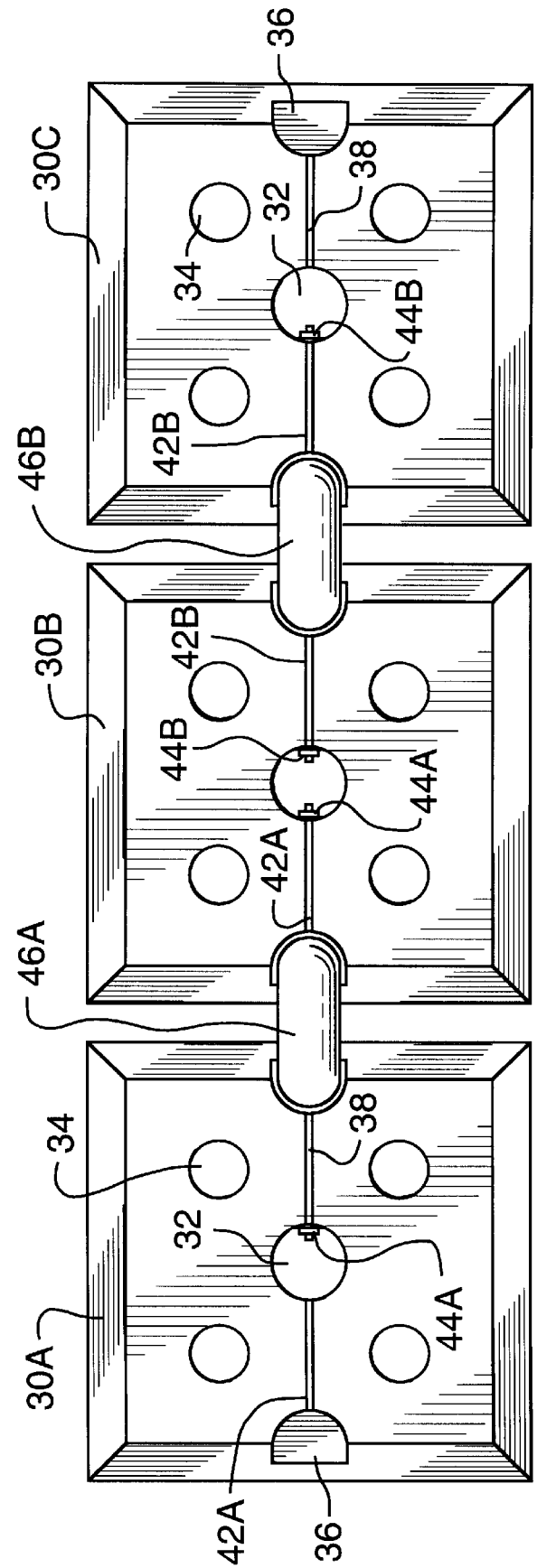
FIG. 9 is an enlarged top view of a chain of three blocks and two connecting members of the preferred embodiment of the integrated armor structural system of FIG. 1.

To better understand the force distribution system within the connecting members, refer to FIG. 9. When hydrodynamic forces are applied to block 30B, in the direction of block 30C, rod 42A, and body member 46B will restrict such movement, creating tension in rod 42A and compression in body member 46B. Rod 42A and the body member 46B act together, in a simultaneous manner, to prevent such movement. As block 30B moves toward block 30C, a gap appears between body member 46A and block 30B, which ensures that there is no compressive stress produced in body member 46A. A gap also appears between block 30B and nut 44B disposed within block 30B, ensuring that no tensile stress is produced in rod 42B. The repositioning of block 30B is resisted by the tensile resistance of the rod 42A and the compressive resistance of the body member 46B. This repositioning force will be distributed in the chain by rod 42A pulling block 30A toward block 30B, and body member 46B pushing block 30C in the general direction of block 30D

(not shown), the next neighboring block in the chain to block 30C. The more blocks 30 and connecting members 40 in the chain 24, the better will be the force distribution, resulting in smaller forces in each block 30.

During backwash, block 30B will tend to move toward block 30A, which will induce the opposite force in the armor chain, as rod 42B will absorb the tensile forces, and body member 46A will absorb the compressive forces.

The rod 42 also carries bending stress when the armor chain 24 rotates sideways. However, the bending stress is small, since the permitted angle and degree of rotation is small. Then channel 38 enables the armor chain 24 to resettle into position, while retaining the connecting member 40 in place.

Figure 12:
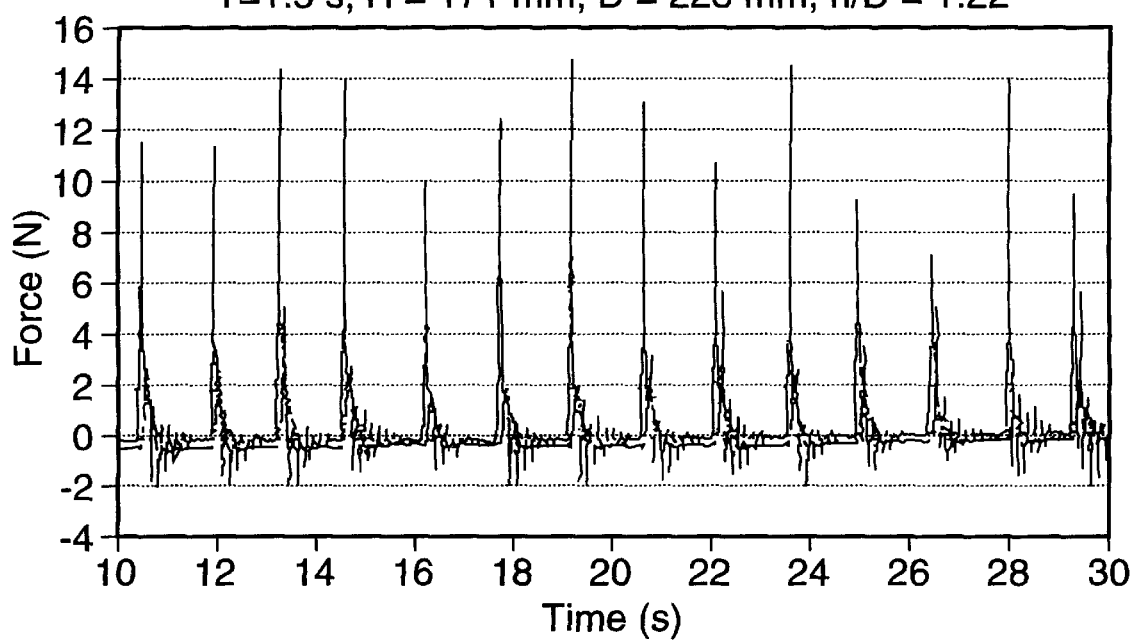
FIG. 12 is a graph showing the typical simultaneous wave forces as applied to two blocks at the leading edge of a low-crested breakwater.

The maximum wave force does not act simultaneously on each block 30. FIG. 12 is a double graph of the wave forces as applied to the crown-corner block 31 is on the seaward side and to the neighboring block 30 on the crown 22 immediately behind the crown-corner block 31. The solid graph line shows the wave forces applied to the crown-corner block 30 immediately behind the crown-corner block 31. As shown, when the wave force at the crown-corner block 31 reaches its peak, the wave force on the neighboring block 30 is almost nil. The hydrodynamic forces on the low-crested breakwaters are greater than the forces on submerged breakwaters, so FIG. 12 illustrates the worst case.

It has been found that the dimensions of a breakwater may be significantly reduced by using the integrated armor system 10 of the subject invention, because the size of the crown is significantly smaller than in conventional designs. The minimum crown width in the integrated armor system 10 is one block 30 sandwiched between two crown-corner blocks 31, whereas the crown width in conventional designs is much larger. Also, it has been found that the maximum force on the blocks 30 on the midslope is much smaller than the force applied to the leading edge. Therefore, by covering the embankment 20 with the integrated armor system 10 of the present invention, the breakwater has been greatly stabilized.

The blocks 30 have a square top and bottom surface 37 and 39. The block 30 preferably has a height of 0.8 meters for wave heights up to 3 meters, and a height of 1.0 meter for wave heights of 3 to 5 meters. For submerged structures, most of the energy from the wave passes over the crown 22 of the integrated armor system 10. Consequently, the hydrodynamic forces acting upon the leading edges of the blocks 30, where the forces are the most intense, is insignificant, even though the wave height may be significant. Accordingly, an armor block 30 having a height of 0.8 meters may be used. An armor block 30 of 0.8 meters is stable with little or no movement if subjected to short waves with equivalent wave heights of up to 3.6 meters. For intermediate ranges a block 30 of 0.9 meters is recommended. For blocks 30 of 0.8 m, a top surface length of 0.68 m is recommended; for block 30 of 0.9 m, a top surface length of 0.75 m is recommended; and for blocks 30 of 1.0 meter, top surface length of 0.85 m is recommended. The length and width of the bottom surface 39 of each block 30 are the same as that of adjoining blocks 30.

For blocks of 0.8 m, a rod length of 75.5 cm is recommended; for blocks of 0.9 m, a rod length of 82.5 cm is recommended; and for blocks of 1.0 meter length, a rod of 72.5 cm is recommended.

The slope on the landward side need not be the same as the slope on the seaward side. The slope on the seaward side is preferably about 1 (vertical) to 12 (horizontal), although steeper slopes of up to 1 to 1.5 may be used on the seaward side. The slope on the landward side may be steeper with a ratio of 1 (vertical) to 1.5 (horizontal). The steeper slope on the landward side may be cost-effective, reducing the amount of core material, and the number of blocks 30 and connecting members 40 used.

The height of the breakwater depends upon the slope of the sea bed, the location of the embankment 20, and the proposed height of the embankment 20. If the crown 22 of the embankment 20 is not normally submerged (a low-crested breakwater), the height of the structure also depends upon the crown 22 elevation above the still water. The height of the breakwater is preferably about 1.50 meters above sea level during normal tides or levels. The distance from the shoreline is also flexible. A breakwater closer to the shoreline will be the most economical. The breakwater can be built as far as 200 meters from the shoreline.

The diameter of each duct 34 is slightly smaller than the diameter of the central passageway 32, being about 160 mm. The width of the channel 38 is about 30 mm. Each recessed opening 36 has the same diameter as the central passageway 32, preferably about 200 mm.

Figure 10A:
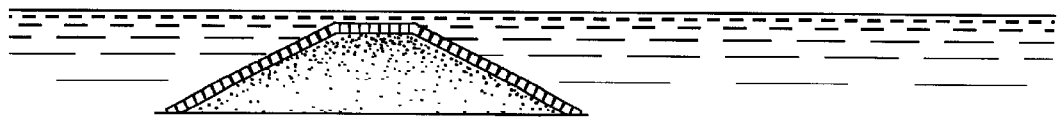
FIG. 10A is a side elevational view of a submerged breakwater made in accordance with the teachings of the present invention.
Figure 10B:
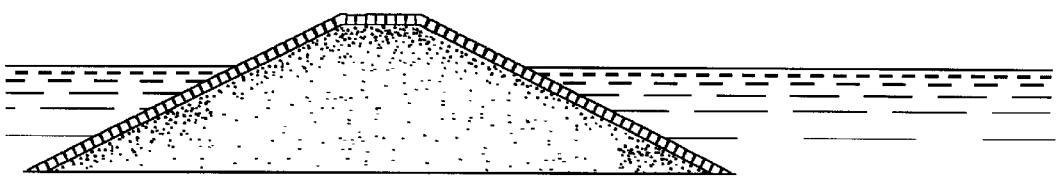
FIG. 10B is aside elevational view of a non-overtopped breakwater similar to FIG. 1, made in accordance with the teachings of the present invention.
Figure 10C:
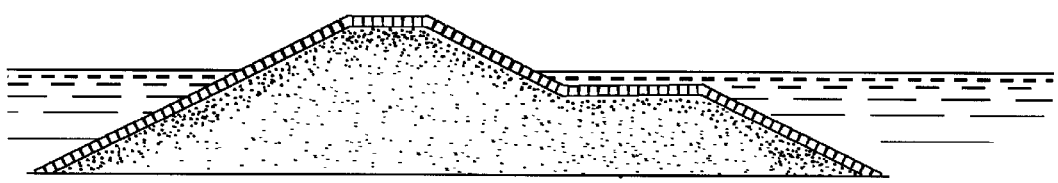
FIG. 10C is a side elevational view of a berm breakwater made in accordance with the teachings of the present invention.
Figure 10D:
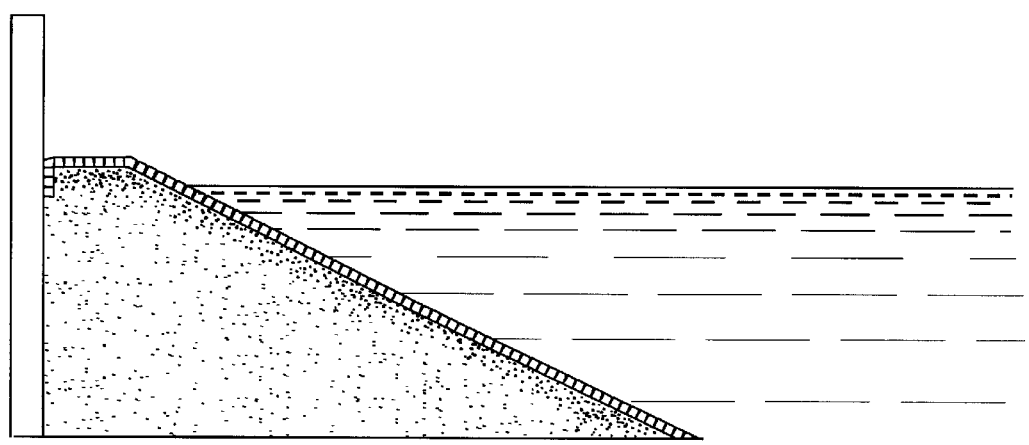
FIG. 10D is a side elevational view of a toe protection structure for a vertical wall made in accordance with the teachings of the present invention.
Figure 10E:
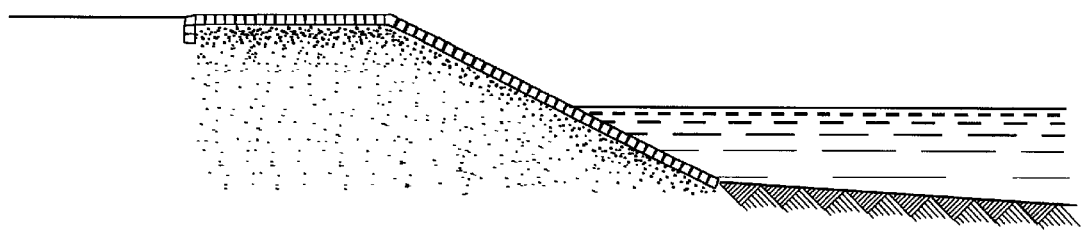
FIG. 10E is a side elevational view of a sea wall made in accordance with the teachings of the present invention.

FIGS. 10A, 10B, 10C, 10D, and 10E disclose various breakwater configurations that may be constructed consistent with the teachings of the present invention. FIG. 10A shows a submerged breakwater. FIG. 10B shows another breakwater, FIG. 10C shows a berm breakwater, FIG. 10D shows a toe protection structure, and FIG. 10E shows a sea wall.

Figure 11A:
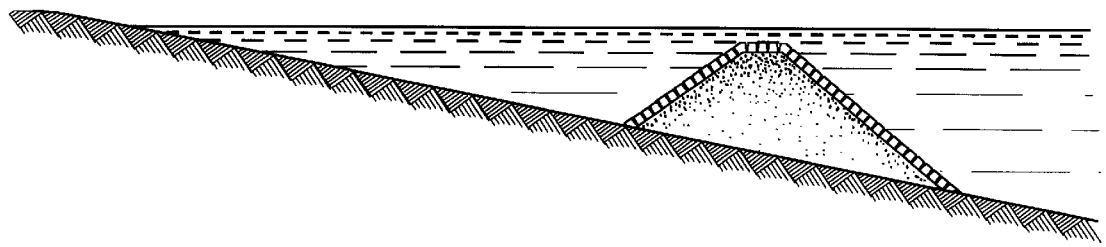
FIG. 11A is a side elevational view of a submerged breakwater on a sloping coastline made in accordance with the teachings of the present invention.
Figure 11B:
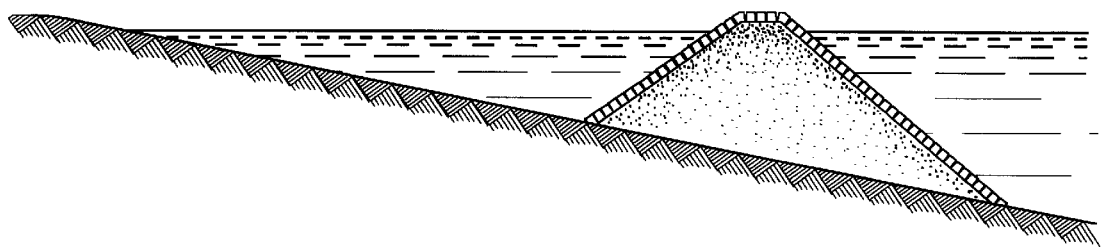
FIG. 11B is a side elevational view of a low-crested breakwater on a sloping coastline made in accordance with the teachings of the present invention.
Figure 11C:
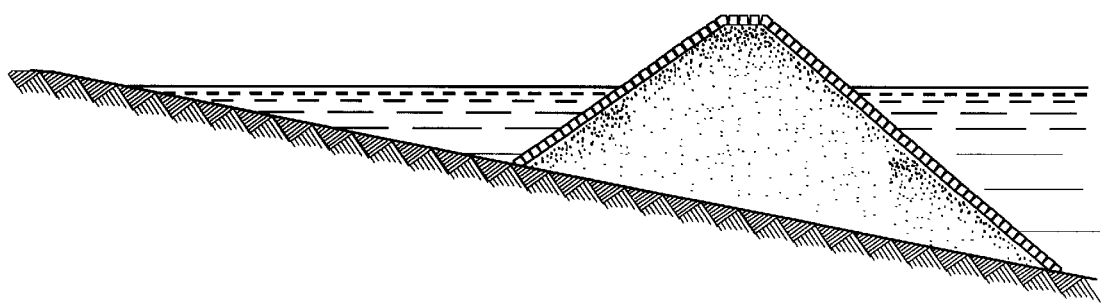
FIG. 11C is a side elevational view of a non-overtopped breakwater on a sloping coastline made in accordance with the teachings of the present invention.

FIGS. 11A, 11B and 11C disclose side elevational views of a breakwaters made in accordance with the teachings of the present invention. FIG. 11A is a side elevational view of a submerged breakwater on a sloping coastline, FIG. 11B discloses a low-crested breakwater on a sloping coastline, and FIG. 11C discloses a non-overtopped breakwater on a sloping coastline.

It should be evident that many alternatives, modifications, and variations of the integrated armor system and components of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

We claim:

1. An erosion control system for installation onto an embankment which abuts a wavefront, the embankment having two sides and a crown, said system comprising:

a plurality of blocks positionable to generally cover a substantial portion of the embankment, each said block having a central passageway extending downwardly from a top surface of the block and a channel extending downwardly from said top surface of the block and extending longitudinally through said block and through said central passageway, said central passageway having a width greater than the width of said channel;

a plurality of connecting members for connecting said blocks longitudinally to extend up one side of said embankment, over said crown, and down the other side of said embankment, each said connecting member having a rod positionable to extend from said central passageway of one block to said central passageway of an adjacent block, distal elements, positionable in said central passageways, which have a width not greater than the width of said central passageways but greater than the width of said channels, said rods thereby absorbing tensile forces between said blocks when installed, and a compressible central body member, around a center area of each said rod positionable, between adjoining blocks for absorbing compressive forces between said adjoining blocks.

2. An erosion control system as recited in claim 1, comprising a plurality of said blocks connected longitudinally by said connecting members to form a chain-like configuration, a plurality of said chain-like configurations adapted for resting next to, but not affixed to, each other on the embankment.

3. An erosion control system as recited in claim 1, where said blocks have recesses in side surfaces thereof to receive said body members.

4. An erosion control system as recited in claim 3, wherein said body members are capsule shaped and said recesses are shaped to cooperate with circular ends of said body members.

5. An erosion control system as recited in claim 1, wherein said blocks have a generally truncated pyramid shape.

6. An erosion control system as recited in claim 1, wherein said distal elements are position adjustable on said rods.

7. An erosion control system as recited in claim 1, wherein said body members are movable along said rods.

8. An erosion control system as recited in claim 1, further comprising a plurality of ducts extending from said top surface to said bottom surface of said block for reducing hydrodynamic uplift forces applied to said bottom surface of said block.

9. An erosion control system as recited in claim 1, further characterized by two crown blocks positionable at a transition between said crown and said sides of said embankment, said crown blocks each having a first part positionable on said crown and having first parallel top and bottom surfaces, and a second part positionable on a side of said embankment and having second parallel top and bottom surfaces angling downwardly from said first parallel top and bottom surfaces.

* * * * *